United States Patent [19]

Wurster

[11] Patent Number: 4,644,146
[45] Date of Patent: Feb. 17, 1987

[54] ROBOTIC VEHICLE OPTICAL GUIDANCE SYSTEM

[75] Inventor: Walter H. Wurster, Orchard Park, N.Y.

[73] Assignee: Calspan Corporation, Buffalo, N.Y.

[21] Appl. No.: 778,593

[22] Filed: Sep. 20, 1985

Related U.S. Application Data

[62] Division of Ser. No. 509,109, Jun. 29, 1983, Pat. No. 4,568,825.

[51] Int. Cl.⁴ .............................................. G05B 1/00
[52] U.S. Cl. ..................................... 250/202; 250/235
[58] Field of Search ............... 250/202, 203, 234, 235, 250/236, 216; 356/1, 4, 5; 180/168

[56] References Cited

U.S. PATENT DOCUMENTS

| | | | |
|---|---|---|---|
| 3,748,644 | 7/1973 | Tisdale | 340/149 A |
| 3,781,111 | 12/1973 | Fletcher et al. | 356/5 |
| 3,897,150 | 7/1975 | Bridges et al. | 356/5 |
| 3,951,549 | 4/1976 | Fowler et al. | 356/5 |
| 3,953,667 | 4/1976 | Layton et al. | 358/113 |
| 4,081,669 | 3/1978 | Klingman, III | 250/199 |
| 4,179,216 | 12/1979 | Theurer et al. | 356/4 |
| 4,195,425 | 4/1980 | Leitz et al. | 356/28 |
| 4,225,226 | 9/1980 | Davidson et al. | 356/1 |
| 4,290,043 | 9/1981 | Kaplan | 356/5 |
| 4,347,511 | 8/1982 | Hofmann et al. | 343/5 PC |
| 4,566,032 | 1/1986 | Hirooka et al. | 180/168 |

Primary Examiner—Gene Wan
Attorney, Agent, or Firm—Biebel, French & Nauman

[57] ABSTRACT

A robotic vehicle is guided along a predetermined path which is to be traversed autonomously by the vehicle. As the vehicle is guided along the path, the area before the vehicle is scanned and discontinuities in the scan scene are reduced to a series of time separated pulses. The pulse series at selected locations along the path are stored such that the vehicle can autonomously retrace the predetermined path by matching pulse series generated by current scanning with stored pulse series. A scanner mirror receives and directs a laser beam through an area before the vehicle along the path to be traversed and receives reflected return signals from the scanned area. Optical detection means receive the return signals from the scanner mirror and generate raw scene signals which are doubly differentiated to generate pulse series representative of the discontinuities of the scanned area. The laser beam is directed upon the scanner mirror such that the beam is surrounded by the reflected return signals effectively within a bore therethrough to effect a boresighted optical scanner and detector system.

4 Claims, 6 Drawing Figures

ROBOTIC VEHICLE OPTICAL GUIDANCE SYSTEM

This is a division of application Ser. No. 509,109, filed June 29, 1983 U.S. Pat. No. 4,568,825.

BACKGROUND OF THE INVENTION

The present invention relates to guidance systems for robotic vehicles and, more particularly, to a method and apparatus for optically programming and guiding a robotic vehicle.

It is oftentimes desirable to have a robotic vehicle autonomously travel a selected path, for example, to distribute and collect mail within an office building. In known prior art arrangements for such robotic vehicles, the path to be traversed is defined, for example, by an electrical conductor which is installed in the floor typically beneath carpeting. A signal which can be detected and followed by the robotic vehicle is then impressed onto the conductor. While such arrangements can be effectively employed, the initial placement of the guiding conductor as well as failures and rearrangements of the conductor can create problems.

It is therefore apparent that the need exists for an improved method and apparatus for guiding a robotic vehicle wherein the path of the vehicle can be quickly and conveniently defined and changed without disruption of the environment in which the robotic vehicle is utilized.

SUMMARY OF THE INVENTION

In accordance with the present invention, an improved method and apparatus are provided for guiding a robotic vehicle by means of scanning the area before the vehicle and generating pulse trains representative of discontinuities in the scanned scene. In the preferred utilization of the present method and apparatus, a robotic vehicle is guided along a predetermined path which is ultimately to be traversed autonomously by the vehicle. As the robotic vehicle is guided along the path, the area before the vehicle is scanned and discontinuities in the scanned scene are reduced to a series of time separated pulses. The pulse series at selected locations along the path are stored into a memory device, for example, of a guidance computer such that the vehicle can autonomously retrace the predetermined path by matching pulse series generated by current scanning with stored pulse series to guide the vehicle along the predetermined path.

Preferably, a boresighted optical scanner and detector system is mounted upon the robotic vehicle to perform the method in accordance with the present invention. The scanner and detector system comprises light means for generating a scanning light beam and a scanner mirror for scanning the light beam at least through an area extending before the vehicle along the path to be traversed and for receiving return signals which are the reflections of the scanning beam from the scanned scene. Optical detection means are positioned to receive the return signals from the scanner mirror and to generate raw scene signals in response to the return signals. Lens means positioned between the scanner mirror and the optical detection means focus the return signals onto the optical detection means. A beam directing mirror is positiond to direct the scanning light beam upon the scanner mirror such that the beam is surrounded by the reflected return signals effectively within a bore through the return signals and hence the optical scanner and detector system is referred to as being boresighted.

Preferably, the scanner mirror is mounted for rotation to direct the scanning light beam upon the area to be scanned as it is rotated. The incidence of ambient illumination on the optical detection means can be reduced by placing an optical filter between the scanner mirror and the optical detection means. The optical filter is designed to pass the scanning beam but block ambient illumination. To facilitate such an arrangement, it is preferable that the light means comprises a laser or other limited bandwidth light source.

To limit further the ambient illumination on the optical detection means, the system preferably comprises a field stop aperture positioned before the optical detection means with the aperture, the lens means and the divergence of the scanning light beam being selected such that the area of the scanning beam upon the scanned area is less than the field stop aperture.

The method of optically guiding a robotic vehicle in accordance with the present invention comprises the steps of: generating a light beam; scanning the light beam at least through an area before the vehicle; receiving reflected return signals of the light beam from the area scanned by the beam; detecting the return signals to generate a raw scene signal; processing the raw scene signal to generate a series of pulse signals corresponding to scene discontinuities within the area scanned by the light beam; and, comparing the series of pulses to stored pulse series to determine the position of the robotic vehicle.

Preferably, the processing step comprises doubly differentiating the raw scene signal and rectifying the doubly differentiated signal to arrive at the series of pulses representative of scene discontinuities within the area scanned by the light beam.

To conveniently define a path to be traversed by the robotic vehicle, the method further comprises the steps of: guiding the robotic vehicle along the desired path; recording selected ones of the series of pulse signals resulting from processing the raw scene signal generated from the reflected return signals; and, utilizing the recorded series of pulse signals as the stored pulse series such that the robotic vehicle is programmed or learns the predetermined path. To reduce the ambient light incident upon the light detector, an additional step of filtering the return signals is desirable.

It is, therefore, an object of the present invention to provide an improved boresighted optical scanner and detector system and a method for utilizing that system to optically guide a robotic vehicle; to provide an optical scanner and detector system wherein a scanning light beam is directed upon a scanner mirror which is rotated to scan an area before a robotic vehicle which scanner mirror also receives reflected return signals, the scanning light beam being directed to the scanner mirror such that it is surrounded by the return signals and effectively within a bore through the return signals; to provide an improved method of optically guiding a robotic vehicle wherein the robotic vehicle is guided along a desired path and a scanning light beam is reflected to generate return signals indicating discontinuities in the scanned area along a path to be traversed by the robotic vehicle such that those signals can be processed and recorded for future autonomous trips by the robotic vehicle; and, to provide a method for processing scene discontinuity data by means of doubly differentiating a raw scene signal and rectifying the doubly differentiated signal to arrive at a series of pulses representative of the scene viewed by a robotic vehicle scanner for a selected location of the vehicle along a path to be traversed by the vehicle.

Other objects and advantages of the invention will be apparent from the following description, the accompanying drawings and the appended claims.

DETAILED DESCRIPTION OF THE INVENTION

Figure 1:
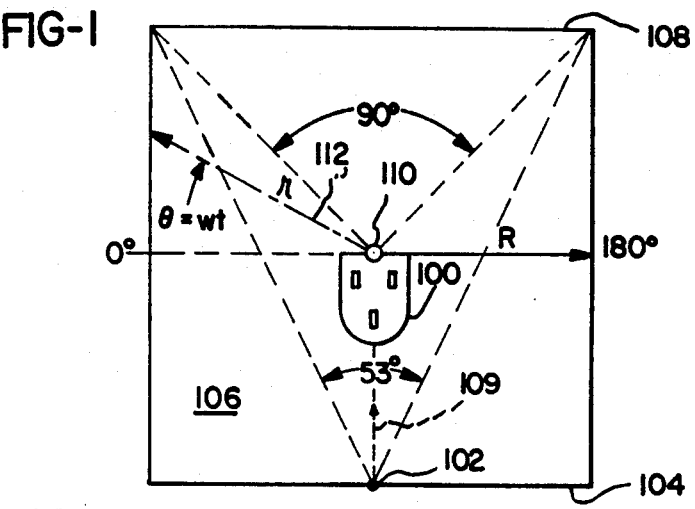
FIG. 1 is a simplified illustration of an application of the robotic vehicle optical guidance system in accordance with the present invention.
Figure 2:
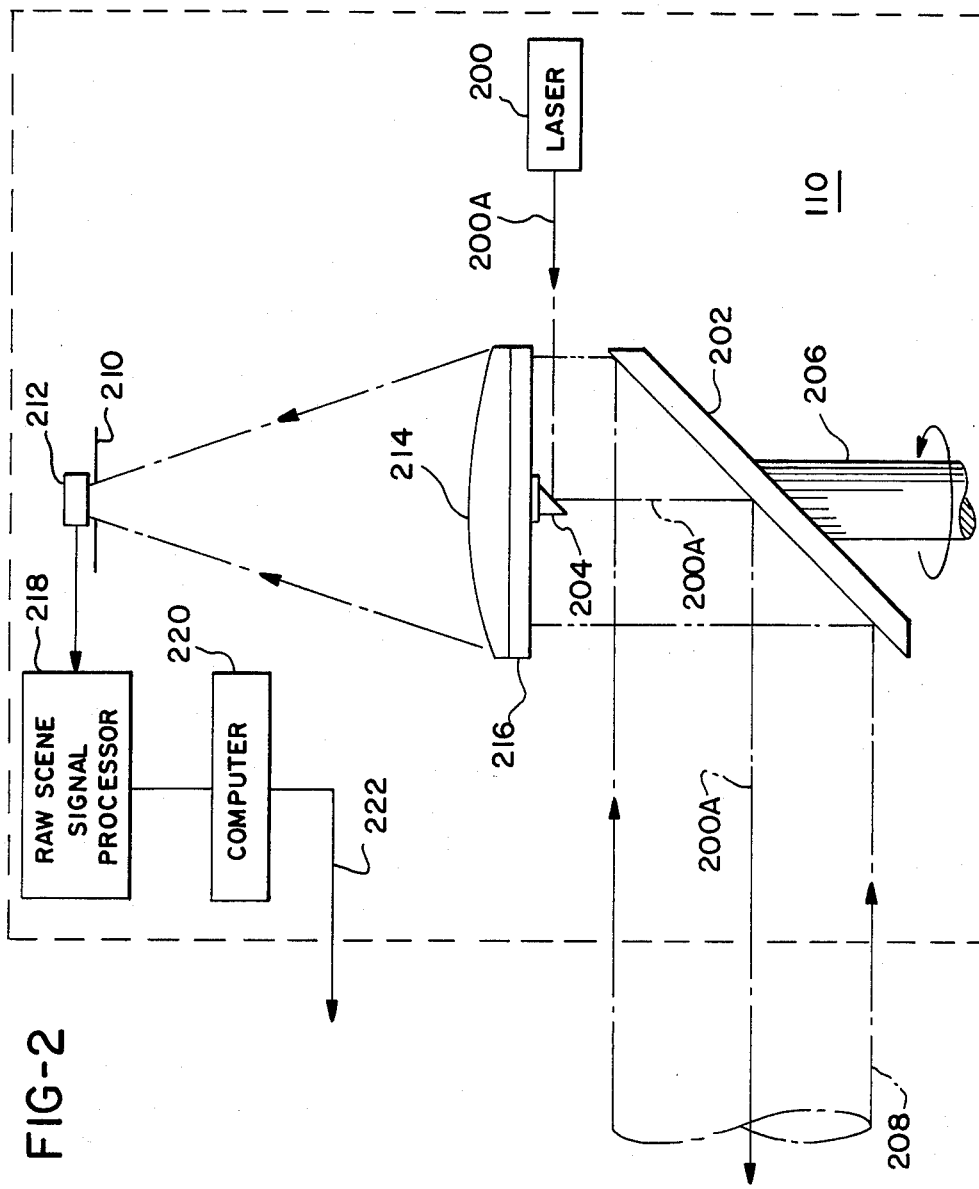
FIG. 2 is a schematic diagram of a bore-sighted optical scanner and detector system in accordance with the present invention.

FIG. 1 illustrates a simplified application of the robotic vehicle optical guidance system in accordance with the present invention. In FIG. 1, a three wheeled robotic vehicle 100 is to move from a point 102 on a first wall 104 of a generally square room 106 toward the opposite wall 108 along a path 109. An optical scanner and detector system 110 is fixedly mounted on the front of the robotic vehicle 100 and scans at least the area before the vehicle 100. A schematic view of the optical scanner and detector system 110 is shown in FIG. 2 and will be described hereinafter.

The scanner and detector system 110 generates a light beam 112 which is scanned at least through the area before the vehicle 100. The height of the scanned light beam may be selected for a given application with typical heights being just above floor level or at an elevation of approximately 6.5 to 8 feet. For elevation, the scanner may be supported on a pylon mounted to the vehicle 100.

The scan area selected in the simplified illustrative embodiment shown in FIG. 1 is from 0° to 180°. As the light beam is scanned through the area ahead of the vehicle 100 along the path 109, reflected return signals are essentially simultaneously detected by the scanner and detector system 110. The return signals are initially converted into analog signals which bear a known relation to the vehicle 100 due to the fixed mounting of the scanner and detector system 110. The signal is doubly differentiated and rectified or otherwise discriminated and shaped to yield a pulse train that corresponds to scene discontinuities such as wall or object corners and edges.

Guidance of the vehicle 100 is on a scene matching basis such that the vehicle is guided along the path 109 by matching a series of scenes as viewed by the scanner and detector system 110 which are compared and matched to stored scene signals.

Error signals are derived by comparing presently generated pulse series with previously stored pulse series to determine the vehicle's progress from the point 102 toward the wall 108. The stored pulse series are preferably generated by moving the vehicle 100 along a predetermined path and recording a selected number of pulse series as the vehicle 100 traverses the predetermined path. More precisely, guidance of the vehicle 100 is based upon triangulation which in the present application is equivalent to measuring the time intervals between pulses of the generated pulse series.

The optical scanner and detector system 110 is shown schematically in FIG. 2. The scanner and detector system 110 comprises light means for generating a scanning light beam and preferably comprises a laser 200. The laser provides coherent light radiation which can be conveniently projected and received upon reflection in accordance with the present invention and also facilitates the rejection of ambient light upon the detection of reflected signals from the area scanned.

Laser light from the laser 200 is directed to a scanner mirror 202 by means of a beam directing mirror 204. From the scanner mirror 202, the laser light is directed to the scene to be scanned. The scanner mirror 202 is mounted for rotation upon a shaft 206 to perform the scanning operation from 0° to 180° as shown in FIG. 1. The scanner mirror 202 is the only moving part of the scanner system in accordance with the present invention and its movement is simplified by continuous rotation of the shaft 206. The 50% duty cycle should be sufficient for most applications; however, it can be increased if needed by means of pylon mounting of the scanner as suggested above or by other optical scanning methods which will be apparent to those skilled in the art.

The laser beam 200A is quite narrow within the scanner and detector system 110 while the size of the return beam 208 is determined by the lens area which effectively is the system aperture stop 210. The return beam 208 is focused upon an optical detector 212 by means of a lens 214 through the aperture stop 210. The aperture stop 210, the focal length of the lens 214 and the laser beam divergence are optimized for each application such that the laser spot at the area to be scanned is always less than the field stop image. In one operable embodiment of the present invention, an image of approximately $\frac{3}{4}$ inch was formed at a range of approximately 10 feet. While a large field stop 210 eases the alignment problems, it also increases ambient illumination pickup and, hence, noise within the signal. Accordingly, a tradeoff must be effected dependent upon the particular system elements and the noise level which can be tolerated.

A narrow passband optical filter 216 at the laser wavelength is also preferably used for additional discrimination against ambient light. The use of such an optical filter permits a larger field stop to be used and/or results in higher signal-to-noise ratios.

The disclosed laser detection technique is adequate for most applications; however, more complex methods of detection such as laser beam chopping and synchronous detection, well known in the art, may be applied in unusual applications of the present invention.

Each scan of the area before the vehicle 100 is processed into a time series of pulses. Since the scanner and detector system 110 is fixed in the vehicle 100, the series of pulses or pulse train defines the position of the vehicle and effectively establishes a set of vectors that can be used for guidance of the vehicle.

The power of the laser 200 can be considered essentially constant and, hence, the recorded signal strength or raw scene signal is determined primarily by the inverse square of the distance to the wall of the room 106 being scanned. Thus, the raw scene signal is given approximately by the equation $$S \sim 1/r^2$$

where $r = R \sec \omega t$ and $S \sim \cos^2 \omega t$.

Figure 3A:
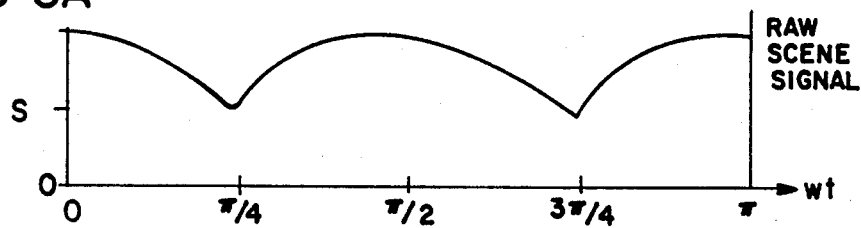
FIGS. 3A through 3D show waveforms generated by the boresighted optical scanner and detector system of FIG. 2 when utilized in the simplified illustrative application shown in FIG. 1.
Figure 3B:
Figure 3C:
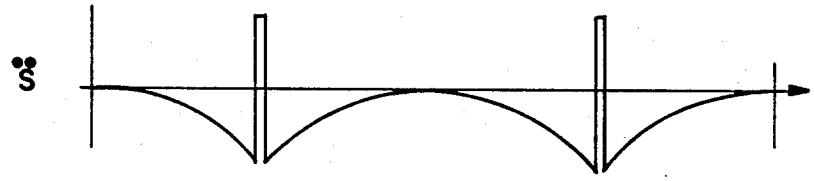

The raw scene and signal S is shown in FIG. 3A with the first and second derivatives of that signal being shown in FIGS. 3B and 3C, respectively. The signals so processed are used to generate a series of pulses such that the spacing in the series of pulses defines ocurrences of discontinuities and changes in the scene being scanned.

Figure 3D:
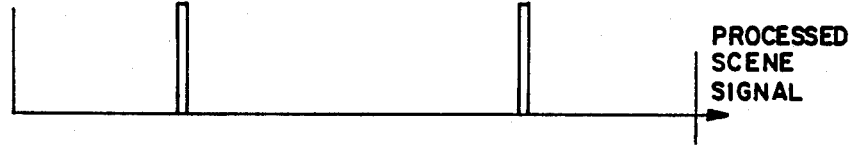

The processed scene signal shown in FIG. 3D can be generated by means of rectification of the doubly differentiated signal shown in FIG. 3C. Preferably, the positive going pulses of the signal shown in FIG. 3C can be utilized to activate a monostable multivibrator or other pulse generating device, as will be apparent to those skilled in the art, to generate uniform amplitude pulses as shown in the processed scene signal of FIG. 3D. Thus, the technique in accordance with the present invention preferably is made independent of variations in the amplitude of the raw scene signal.

In some cases, smoothing of the raw scene signals may be desired. For example, in scanning across a doorway, the several edges of the door jamb may give rise to a series of closely spaced pulses. The high spatial resolution may be purposely degraded by means of defocusing the optical system, electronic filtering on in a variety of other ways apparent to those skilled in the art. Accordingly, the raw scene signal is simplified by reduction to a number of major scene discontinuities or changes compatible with path precision and data processing constraints. Simplification of the scanner and detector system 110 as well as in the signal processing is possible where the placement of retroreflecting tape strips or pylons is permissible along the path 109 to be traversed by the vehicle 100.

The optical detector 212 generates the raw scene signal as shown in FIG. 3A. The raw scene signal is doubly differentiated and further processed and discriminated as described above by a raw scene signal processor 218 to generate the processed scene signal of FIG. 3D, which signal is passed to a computer 220. The computer 220 in turn compares the present scanned pulse series with a stored pulse series.

The stored pulse series is preferably previously generated and stored by moving the vehicle along a predetermined path to be traversed by the vehicle, e.g., the path 109, and storing pulse series generated at selected points along that path. The computer 220 generates error signals defining the differences between the presently scanned series of pulses and one of the stored series of pulses on the conductor 222. The error signals are used by a conventional robotic vehicle drive system (not shown) to direct the robotic vehicle 100 into a position where the scanned scene corresponds substantially to the stored scene at the selected locations along the traversed path. In this way, the robotic vehicle 100 is caused to traverse the predetermined path as preferably stored into a memory of the computer 220.

As illustrated by FIG. 1, the scene record stored into memory of the computer 220 with the vehicle 100 positioned approximately at the spot 102 on the wall 104 in a series of two pulses 53° apart centered in the scan. If the vehicle advances straight ahead until the pulses are 90° apart as demanded by the series of scenes stored in a memory of the computer 220, the vehicle traverses the path shown from the spot 102 to the position of the vehicle in FIG. 1. It can be seen that the included angle between the two pulses together with the angle from 0° to the first pulse uniquely define the position and orientation of the vehicle as shown in FIG. 1.

In most practical applications, more than two pulses would be desirable and a more complex driving arrangement would be employed. However, the simplified two pulse system of FIG. 1 has been presented for ease of illustration and description of the present invention. Actual implementation of a system to specific vehicular functions such as material handling, mail delivery and the like will be performed on an application-by-application basis and will be apparent to those of ordinary skill in the art in view of the present disclosure.

While the method herein described and the form of apparatus for carrying this method into effect constitute preferred embodiments of this invention, it is to be understood that the invention is not limited to this precise method and form of apparatus and that changes may be made in either without departing from the scope of the invention which is defined in the appended claims.

What is claimed is:

1. A method of optically guiding a robotic vehicle comprising the steps of:
   generating a light beam;
   scanning said light beam at least through an area extending before the vehicle along a path to be traversed by said vehicle;
   receiving return signals comprising reflections of said light beam from the area scanned by said light beam;
   detecting said return signals to generate a raw scene signal;
   processing said raw scene signal to generate a series of pulse signals corresponding to scene discontinuities within the area scanned by said light beam; and
   comparing said series of pulses to stored pulse series to determine the position of said robotic vehicle.

2. A method as claimed in claim 1 wherein said processing step comprises the steps of:
   doubly differentiating said raw scene signal; and
   rectifying the doubly differentiated signal to arrive at said series of pulses.

3. A method as claimed in claim 2 further comprising the steps of:
   guiding said robotic vehicle along a predetermined path;
   recording selected ones of said series of pulse signals resulting from processing said raw scene signal; and
   utilizing said recorded series of pulse signals as said stored pulse series whereby said robotic vehicle is trained to retrace said predetermined path.

4. A method as claimed in claim 3 wherein said detecting step is preceded by the step of filtering said return signals to reduce optical noise which would otherwise effect said raw scene signal.

* * * * *